Figure 1:
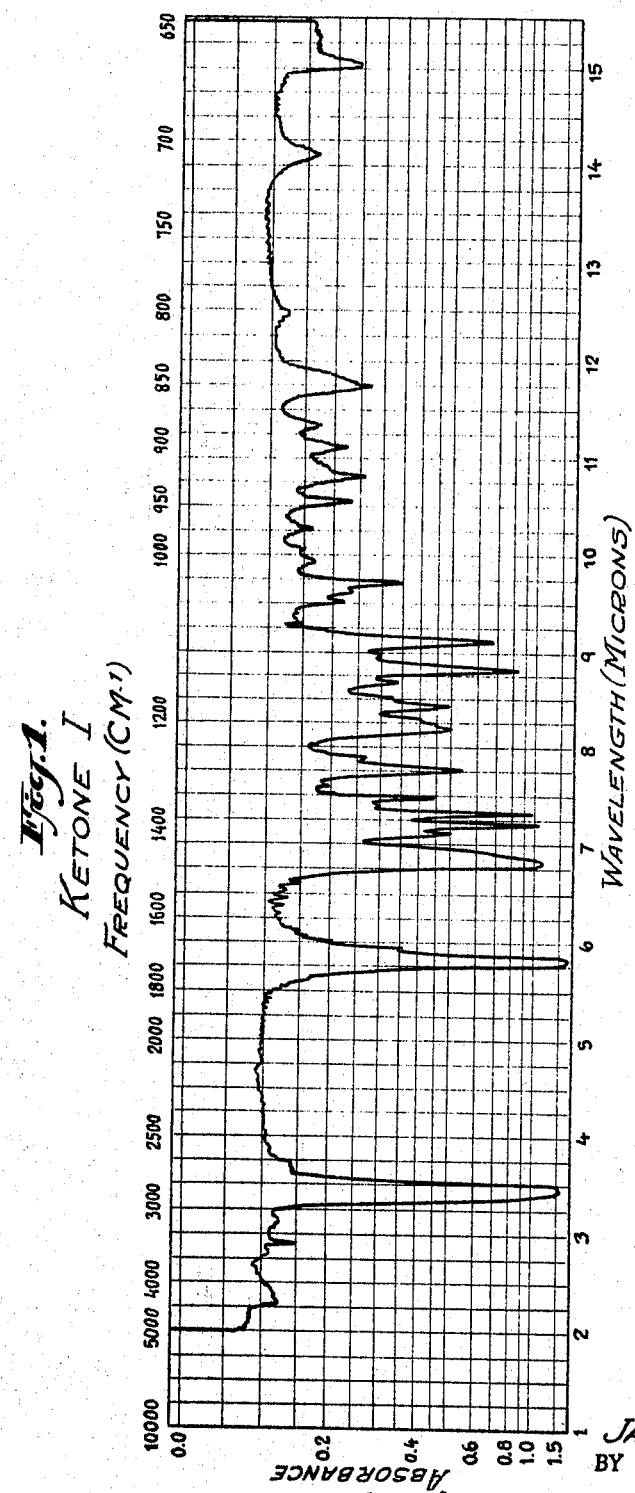

KETONE II

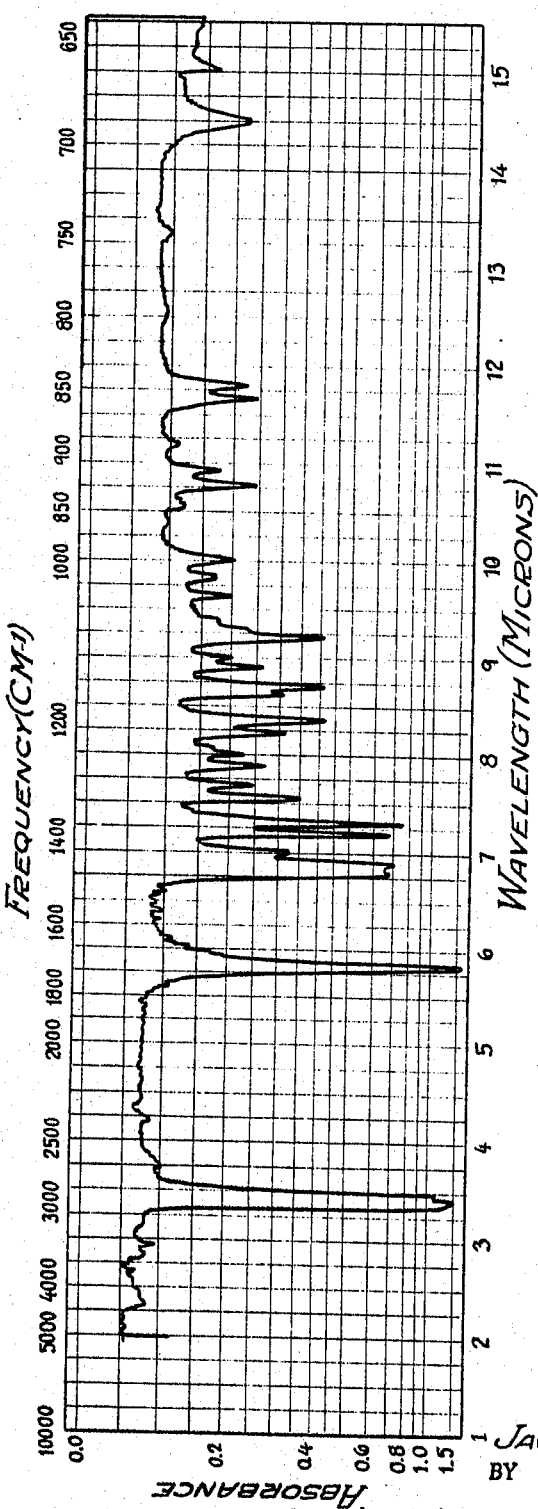

United States Patent Office 3,265,739
Patented August 9, 1966

3,265,739
PREPARATION OF 2-OCTALONES
Jack H. Blumenthal, New Monmouth, N.J., assignor to International Flavors & Fragrances Inc., New York, N.Y., a corporation of New York
Filed Feb. 23, 1962, Ser. No. 175,028
4 Claims. (Cl. 260—586)

This invention relates to unsautrated bicyclic ketones and the corresponding saturated compounds which are perfumes; also to intermediates therefor. These unsaturated ketones belong in the family of compounds known as 2-octalones.

The principal object of the invention is to provide a series of useful compounds of the type mentioned, and to provide simple, efficient processes for the production of such compounds.

The invention comprises the novel products and processes the specific embodiments of which are described hereinafter by way of example, and in accordance with which I now prefer to practice the invention.

I have found in accordance with my invention compounds having the formulae

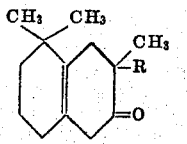

and

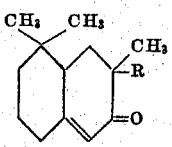

where R is H or a lower alkyl containing not more than 4 carbon atoms. More specifically, I have found two tetramethyl substituted unsaturated bicyclic ketones I and II, and the ketone obtained by hydrogenation of the double bond thereof, III:

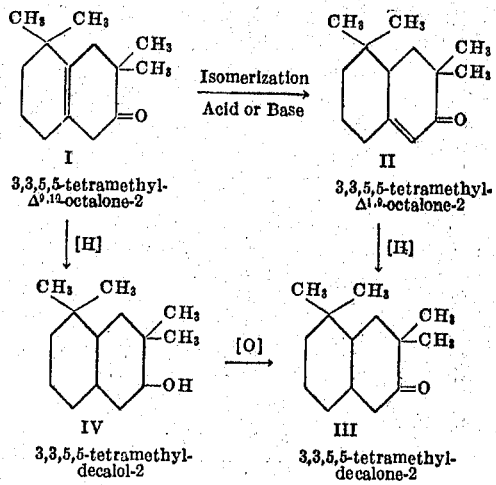

The above compounds, except the intermediate alcohol IV, possess odors which are useful as perfume materials.

I have found in accordance with my invention that ketones such as I or II may be prepared by the process which comprises cyclizing the compound

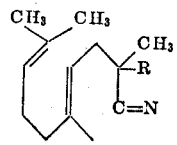

where R is either H or a lower alkyl containing not more than 4 carbon atoms, with a strong mineral acid selected from the group consisting of concentrated sulfuric acid and polyphosphoric acid to produce a substance selected from the group consisting of

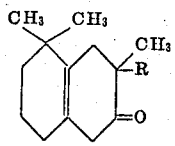

and

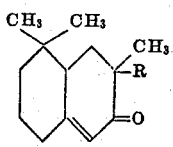

where R is as above.

The unsaturated ketones I and II, where R is $CH_3$ are synthesized by the cyclization of geranyl isobutyronitrile

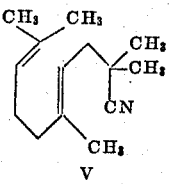

which, as well as other nitriles thus usable in accordance with my invention, may be made in accordance with my copending application Serial No. 112,916, now U.S. Patent No. 3,168,550. Cyclization of V with concentrated sulfuric acid yields ketone I, while cyclization of V with polyphosphoric acid yields ketone II.

These octalones I and II may also be prepared in a two step procedure by first cyclizing geranyl isobutyronitrile V to the mono cyclic nitrile

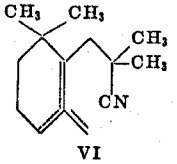

with 85% phosphoric acid and then cyclization of VI with either concentrated sulfuric acid or polyphosphoric acid to form the bicyclic ketones I or II. Another method of obtaining ketone II is by the isomerization of I with a dilute solution of hydrogen chloride in methanol or with a dilute solution of sodium methylate in methanol.

The carbon-carbon double bond of ketone II is readily hydrogenated at room temperature with 5% palladium on carbon as catalyst, without affecting the carbonyl group, to give a practically quantitative yield of III. The carbon-carbon double bond of I is difficult to hydrogenate without simultaneously reducing the carbonyl group. However, as an alternative procedure I may be completely reduced to the saturated alcohol IV which then may be reoxidized under standard conditions to the saturated ketone. The trimethyl substituted octalones VII and VIII and the corresponding saturated ketone IX (disclosed below) may be similarly prepared by the above procedures starting with geranyl propionitrile (X) [prepared in accordance with my copending application Serial No. 112,916], in place of geranyl isobutyronitrile. The formulae are as follows:

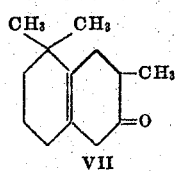
VII
3,5,5-trimethyl
Δ$^{9,10}$-octalone-2

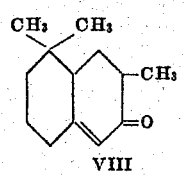
VIII
3,5,5-trimethyl
Δ$^{1,9}$-octalone-2

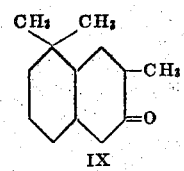
IX
3,5,5-trimethyl
decalone-2

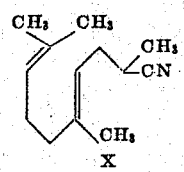
X
α-geranyl
propionitrile

The process by which the ketones herein described are prepared includes (a) the novel preparation of 2-octalones from a nitrile, and (b) the novel formation of such bicyclic structure in one step from an aliphatic compound.

The mechanism of this reaction for ketones I and II, passing through V and VI is believed to proceed as indicated below via the monocyclic nitrile:

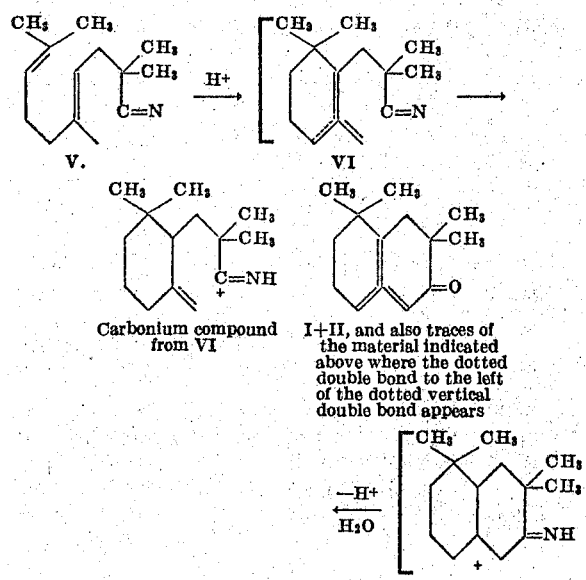

The infrared spectrum of ketone I shows strong absorptions which are indicative of a non-conjugated carbonyl (1720 cm.$^{-1}$) and gem-dimethyl groups (1362 and 1385 cm.$^{-1}$). The infrared spectrum of ketone II shows strong absorptions indicative of a conjugated carbonyl (1672 and 1625 cm.$^{-1}$) and gem-dimethyl groups (1365 and 1382 cm.$^{-1}$) and also a strong absorption at 880 cm.$^{-1}$. Ketone II also exhibits a typical UV absorption at 240 mµ. NMR absorption curves confirm the structure of I, II and III as represented.

The temperature of reaction for I may vary from —20° to +20°, while —10° to 0° is preferred. At higher temperatures increasing amounts of the conjugated isomer are produced while cooling below —10° is not economical on a large scale. Any organic solvent which will not react with concentrated sulfuric acid or polyphosphoric acid at reaction temperature may be used. Nitropropane and saturated hydrocarbons such as hexane are good solvents for this reaction. The usual commercial grade of concentrated sulfuric acid (96%) is preferred because of its convenience, although concentrations as low as 90% have given equally good results. The ratio of moles of concentrated sulfuric acid per mole of nitrile is not critical and has been varied from 1(sulfuric):1(nitrile) to 20:1 with good results. For the conjugated isomer, a commercial grade of polyphosphoric acid has been used, although other preparations of varying percentages of $P_2O_5$ may prove equally useful.

The following are examples of the process as I now prefer to practice it. It is to be understood that the invention is not to be considered as limited to the examples except as indicated in the appended claims.

All temperatures mentioned herein are in ° C.

All pressures herein are in mm. of mercury unless otherwise indicated.

EXAMPLE 1

To a mixture of 420 grams of concentrated sulfuric acid (96%) and 500 ml. of hexane which had been cooled to —10° was added with good stirring a pre-cooled solution of 168 grams (0.82 mole) of geranyl isobutyronitrile prepared as above described, in an equal volume of hexane over a period of 20 minutes, while maintaining the temperature of the reaction at —10°. The cooling bath was removed and the mixture stirred until the temperature reached 0° (about 10 minutes). The reaction mixture was then poured with stirring into a mixture of 800 grams of ice and 800 grams of water. The mixture was adjusted with sodium hydroxide to pH 5 while maintaining the temperature under 30°. It contained an oil and an aqueous layer. The oil layer was separated and the aqueous layer, after standing for 30 minutes was extracted twice with hexane. The combined organic layers were washed twice with 10% $H_2SO_4$ and then washed neutral with salt solution, 5% sodium bicarbonate and salt solution. The solvent was removed and the residue distilled at 1 mm. without a column (boiling point range 90–100°) to yield 93 grams of material testing 95% as ketone (52% yield of crude product). The vapor-phase chromatogram (VPC) showed the presence of one major (90%) and one minor peak (10%). Fractionation at 2 mm. through a 12" packed column gave a good separation of the isomeric ketones. The main fraction was ketone I; boiling point 95° at 2 mm. $n_D^{20}$ 1.4930.

NMR (Nuclear Magnetic Resonance) absorption data confirmed the structures of the ketone as follows:

| Tau value: | Multiplicity |
|---|---|
| 9.03 | Singlet. |
| 8.98 | Do. |
| 8.63, 8.47 | Multiplet. |
| 8.17 | Do. |
| 7.85 | Singlet. |
| 7.35 | Do. |

The infrared curve referred to below shows the presence of non-conjugated ketone I and a trace of ketone II. The product has a fine, woody perfume.

Geranyl isobutyronitrile may be prepared by the condensation of isobutyronitrile with the allylic chloride obtained by the addition of HCl to myrcene (U.S. Patent 2,882,323) by means of sodamide, as described in my copending application Serial No. 112,916.

EXAMPLE 2

To 2400 grams of polyphosphoric acid at 50° was added with stirring in about one hour, 410 grams (2 moles) of geranyl isobutyronitrile. The temperature was allowed to rise during the addition to 105°. The reaction mixture was stirred for two hours at 100–105° and then was poured with stirring into 7200 grams of warm water. The mixture was adjusted to a pH of 5 by addition of 30% sodium hydroxide and then stirred at 70°–80° for one hour. Two layers formed. The lower layer was separated and the upper layer washed twice with 300 grams of aqueous HCl (1:1); then succesively with salt solution, 5% sodium carbonate and salt solution. The solvent was distilled off and the residue flash distilled at 3 mm. The distillate was fractionated through a 12 plate column at 3 mm. The main cut which solidified on standing weighed 257 grams and tested 97% ketone (60% of theory). Recrystallization from aqueous ethanol yielded ketone II, a white crystalline solid, melting at 58°, which showed one peak by VPC. Its UV absorption was that expected of a conjugated ketone of this type with a λ max of 240mµ, ε=15,900. The product has a woody, tobacco-like perfume.

NMR absorption data confirmed the structure of the ketone as follows:

| Tau value: | Multiplicity |
|---|---|
| 9.23, 9.05 | Doublet. |
| 9.01 | Singlet. |
| 8.55, 8.45, 8.36 | Multiplet. |
| 8.00, 7.85 | Do. |
| 4.42 | Singlet. |

EXAMPLE 3

In a micro hydrogenation apparatus was placed 26 grams of ketone II, 180 ml. of ethyl acetate and 1.5 grams of 5% palladium on carbon. Hydrogen was admitted at 1 cm. mercury pressure at 30° to 33° until there was no further uptake of the gas. After recovery of solvent, the residue (25 grams) was fractionated at 3 mm. through a short column. The distillate had not absorption at 240 mµ, showed only one peak at VPC and had the following physical constants: B.P. 105°/3 mm., $n_D^{20}$ 1.4827, $D_{30}^{20}$ 0.9512. On standing the material formed white crystals. After recrystallization from aqueous ethanol ketone III melted at 35°. The product has a sweet, woody perfume.

NMR absorption data confirmed the structure of the ketone as follows:

| Tau value: | Multiplicity |
|---|---|
| 9.17, 9.03 | Doublet. |
| 9.00, 8.86 | Do. |
| 8.63 | Multiplet. |
| 7.92 | Do. |

EXAMPLE 4

To a mixture of 58 grams of concentrated sulfuric acid and 70 ml. of hexane which was cooled to −10° was added with stirring a cooled solution of 22 grams of geranyl propionitrile in 22 ml. of hexane over a period of fifteen minutes. The temperature was maintained at −10° during the addition by cooling with a Dry Ice acetone bath. After the addition was completed, the cooling bath was removed and the stirring continued for fifteen minutes while the temperature rose to 0°. The reaction mixture was then poured with stirring into a mixture of 110 grams of ice and 110 grams of water and the aqueous mixture brought to a pH of 7 with 20% sodium hydroxide solution. Two layers formed. The upper layer was separated and the aqueous lower layer extracted once with 100 ml. of benzene. The combined organic layers were washed twice with 10% sulfuric acid, then with salt solution, 5% sodium bicarbonate and salt solution and dried over magnesium sulfate. The solvents were stripped off and the residue distilled. The distillate (B.P. 86° at 0.7 mm.) contained 90% ketone (m.w. 192) by oximation, and showed one major and two minor peaks by V.P.C. Infra red absorption indicated that the product contained ketone VII and some ketone VIII. The product had a rich, attractive, woody perfume.

Geranyl propionitrile was prepared by the condensation of propionitrile with the allylic chloride obtained by the addition of HCl to myrcene (according to U.S. Patent No. 2,882,323) by means of sodamide, as described in my copending application Serial No. 112,916.

EXAMPLE 5

Part A

In a three liter stainless steel autoclave was placed 248 grams of crude ketone I (obtained as in Example 2—before fractionation), 260 grams of diisobutyl carbinol and 60 grams of Raney nickel. The mixture was hydrogenated at 200° and 2000# hydrogen pressure p.s.i. until absorption of gas ceased. After cooling to 50° the catalyst was removed, the solvent stripped off under vacuum and the residue distilled at 3 mm. through a short column filled with Berl saddles. There was obtained, 224 grams of the saturated alcohol IV, B.P. 110–120° at 3 mm., which crystallized on standing.

Part B

In a two liter flask was placed 210 grams of the product (IV) from Part A, 100 grams of benzene, 360 grams of water, and 125 grams of sodium dichromate. To this mixture was added over a period of one hour at 50°–55° with stirring, a mixture of 200 grams of concentrated sulfuric acid (96%) and 200 grams of water. Stirring was continued for three hours at 50°–55° after addition was completed. The mixture was separated and the aqueous layer extracted with 100 grams of benzene. The combined organic layers were washed successively with brine, 10% sodium carbonate solution and brine again until neutral to litmus. The solvent was distilled off and the residue distilled rapidly through a short column at 3 mm. The distillate was fractionated through a 10 plate column to yield 178 grams of ketone III, B.P. 98°–100° at 2.5 mm. $n_D^{20}$ 1.4827, $D_4^{20}$ 0.9503.

EXAMPLE 6

In a one liter flask was placed 237 grams of methanol and 11.5 grams of hydrogen chloride was added. With stirring, 237 grams of crude ketone I (obtained as in Example 2—before fractionation) was added. The solution was refluxed for two hours and then poured into a mixture of 950 grams of water and 220 grams of benzene. After stirring for ten minutes, the aqueous layer was separated and the upper layer was washed with 10% sodium carbonate and then with water until neutral to litmus. The solvent was removed and the residue distilled rapidly through a short column at 3 mm. The distillate was fractionated through a 12 plate column and yielded 160 grams of material with a congealing point of 40° or higher. This material contained about 3% of ketone I by V.P.C. On recrystallization from dilute ethanol pure ketone II was obtained.

Figure 2:
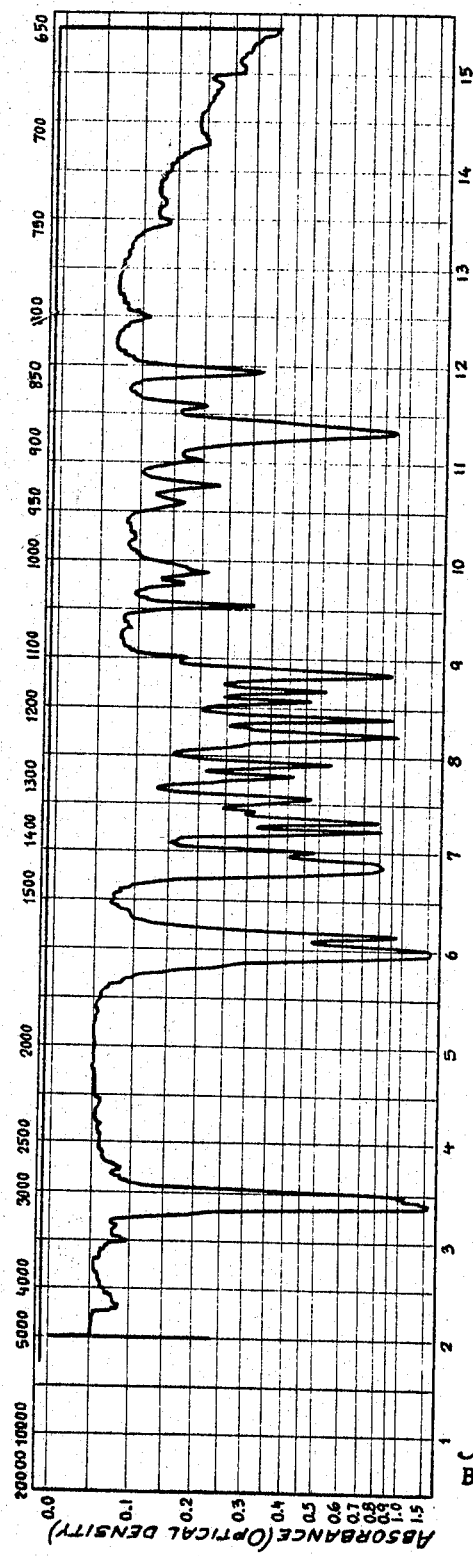

In the accompanying drawings forming part of this application:
  FIGURE 1 is an infrared graph for ketone I.
  FIGURE 2 is an infrared graph for ketone II.
  FIGURE 3 is an infrared graph for ketone III.

I claim:
  1. The process which comprises cyclizing the compound

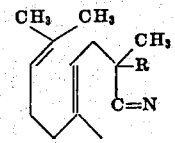

where R is selected from the group consisting of H and a lower alkyl containing not more than 4 carbon atoms, by subjecting said compound to a strong mineral acid selected from the group consisting of concentrated sulfuric acid and a polyphosphoric acid to produce a cyclized substance selected from the group consisting of

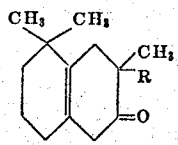

and

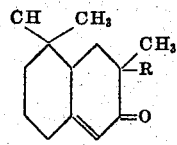

where R is as above.

2. The process which comprises cyclizing geranyl isobutyronitrile by subjecting it to concentrated sulfuric acid to produce 3,3,5,5-tetramethyl-$\Delta^{9,10}$-octalone-2, having the formula.

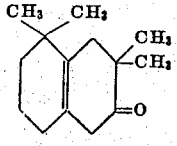

3. The process which comprises cyclizing geranyl isobutyronitrile by subjecting said nitrile to polyphosphoric acid to produce 3,3,5,5-tetramethyl-$\Delta^{1,9}$-octalone-2, having the formula

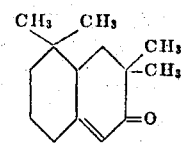

4. The process which comprises cyclizing α geranyl propionitrile by subjecting it to a strong mineral acid to produce a substance selected from the group consisting of 3,5,5-trimethyl-$\Delta^{9,10}$-octalone-2 and 3,5,5-trimethyl-$\Delta^{1,9}$-octalone-2 having respectively the formulae

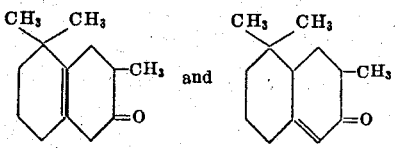

References Cited by the Examiner

UNITED STATES PATENTS

2,912,462  11/1959  Goldstein et al. _____ 260—586

OTHER REFERENCES

Armour et al.. Helv. Chim. Acta, vol. 42, pp. 2233–44 (1959).

Augustine: J. Org. Chem., vol. 23, pp. 1853–6 (1958).

Elsevier's Encyclopedia of Organic Chemistry, edited by F. Radt., Series III, vol. 12B, pp. 2573–4 (1950).

Robinson et al.: J. Chem. Soc. (London), 1941, pages 386–91 (page 388 relied upon).

LEON ZITVER, *Primary Examiner.*

LORRAINE A. WEINBERGER, DANIEL D. HORWITZ, *Assistant Examiners.*